United States Patent [19]

Gebauer et al.

[11] Patent Number: 4,518,283

[45] Date of Patent: May 21, 1985

[54] HARDENABLE SYNTHETIC RESIN COMPOSITION AND ITS USE

[75] Inventors: Ludwig Gebauer, Stuttgart; Hans-Jürgen Irmscher, Emmering; Gusztav Lang, Munich; Peter Mauthe, Kleinberghofen, all of Fed. Rep. of Germany

[73] Assignee: Hilti Aktiengesellschaft, Fürstentum, Luxembourg

[21] Appl. No.: 513,152

[22] Filed: Jul. 13, 1983

[30] Foreign Application Priority Data

Jul. 16, 1982 [DE] Fed. Rep. of Germany ....... 3226602

[51] Int. Cl.³ .................... B65D 25/08; C08L 67/06
[52] U.S. Cl. .................................. 405/260; 523/500; 523/513; 524/906; 525/7
[58] Field of Search ............... 523/500, 513; 525/7; 524/906; 206/219; 405/259, 260, 261

[56] References Cited

U.S. PATENT DOCUMENTS

| | | | |
|---|---|---|---|
| 3,324,663 | 6/1967 | McLean | 405/261 |
| 3,652,489 | 3/1972 | Crowe et al. | 523/513 |
| 3,692,736 | 9/1972 | Besnard et al. | 523/513 |
| 3,755,213 | 8/1973 | Kendall et al. | 523/513 |
| 3,914,200 | 10/1975 | Oswitch et al. | 524/906 |
| 4,136,134 | 1/1979 | Plaisted | 206/219 |
| 4,177,563 | 12/1979 | Schmitz-Josten et al. | 524/906 |
| 4,273,689 | 6/1981 | Smearing | 524/906 |
| 4,280,943 | 7/1981 | Bivens et al. | 524/906 |
| 4,350,783 | 9/1982 | Talbot | 524/906 |
| 4,353,463 | 10/1982 | Seeman | 405/259 |

Primary Examiner—Ronald W. Griffin
Attorney, Agent, or Firm—Toren, McGeady and Stanger

[57] ABSTRACT

A two-component mortar composition for securing stays and for rock stabilization in mining having an unsaturated polyester in one component and a hardener material in the other. The composition comprises a total of 15 to 35 weight percent of unsaturated polyester, 9 to 25 weight percent of reactive diluent, 44 to 66 weight percent of filler, 0.5 to 4 weight percent of thixotropic agent, and 1 to 6 weight percent of a hardener which is a free radical curing catalyst. The composition exhibits desired strength levels and also exhibits the desired securing properties for mortar compositions as well as ease of handling.

15 Claims, No Drawings

1

HARDENABLE SYNTHETIC RESIN COMPOSITION AND ITS USE

BACKGROUND OF THE INVENTION

1. Field of the Invention

The invention relates to a two-component mortar composition which is based on unsaturated polyesters suitable for securing elements used in construction.

2. Description of the Prior Art

It has long been known to use ampules or similar containers having destructible wall material for securement purposes, e.g., for securing stays, such as, tie bars, and for rock stabilization in mining. This is accomplished by inserting the container into a borehole. Besides fillers and, if necessary, other auxiliaries, these ampules which are frequently referred to as mortar cartridges, contain a hardenable synthetic material and, separately, a hardener intended for this material. By driving the stay or reinforcing device into the borehole, optionally with simultaneous rotary motions, the wall of the ampule is destroyed, the partition between the hardenable synthetic material and the hardener is removed or destroyed, and some degree of mixing is effected which finally leads to curing of the synthetic material. In this process, good mixing is of essential importance in order to avoid the formation of pockets of unreacted material. Manually, this can be accomplished only with difficulty, so that the rotary motion is usually effected by machine. With good mixing, the fillers contained in the hardenable synthetic resin composition permit compression and extension-resistant and essentially shrinkage-free curing to take place.

It is also possible to mix the two components which react with curing, after they are delivered separately, e.g., in drums, and to feed them into the boreholes with auxiliary equipment, such as, injection tubes, trowels or hoses.

Viscosity is a major problem when such hardenable synthetic resin compositions are used for securing purposes. At building sites, for example, it must be taken into account that work will have to be carried out within a relatively wide temperature range, for example, from +5° to +40° C. On the one hand, the viscosity should be sufficiently low at lower temperatures so that the composition does not have too high a flow resistance and can be applied by means of a handgun. A low viscosity is also important so that the mixing tools can achieve satisfactory mixing. On the other hand, the properties of the composition in the upper temperature range should be such that the composition does not drip after the pressure of the handgun is released and does not run out when applied horizontally or vertically overhead.

Prior to the present invention, a manually injectable two-component composition which can be metered out and which, after being mixed by means of a static mixer, secures the stay, e.g., a plug-in tie bar installed by hand power, with a strength comparable to the strength of the tie rod, was not known. Such a two-component composition which can be fed into a borehole by hand with, for example, a conventional handgun using two cartridges and a static mixer, would be highly desirable because of the ease of handling and the independence from having to use machinery.

SUMMARY OF THE INVENTION

We have discovered a mortar composition which is free of the former disadvantages and which has the above-noted desirable properties. More particularly, the present invention comprises a two-component mortar composition based on unsaturated polyesters, reactive diluents, fillers, thixotropic agents, and other optional conventional additives, as well as a free radical curing catalyst, wherein the unsaturated polyester is contained in the one component and the hardener is contained in the other component. In accordance with the invention, a total of 15-35 weight percent of unsaturated polyester, 9-25 weight percent of reactive diluent, 44-46 weight percent of filler, 0.5-4 weight percent of thixotropic agent, and 1-6 weight percent of free radical curing catalyst are present, the percentages being based in each case on the total composition. Such compositions, on the one hand, have the desired strength level and, on the other, show the required viscosity behavior.

DESCRIPTION OF THE PREFERRED EMBODIMENT

The attendant materials, such as, reactive diluents, fillers, thixotropic agents and other conventional auxiliaries, such as, stabilizers, extenders, etc., can be contained in the polyester component as well as in the hardener component or in both components. Preferably, however, the reactive diluent is contained in the polyester. The only critical factor is that the sum of the components falls within the inventive limits defined above.

A modification in which the two-components, that is, the component containing the unsaturated polyester, and the component containing the hardener, have approximately the same viscosity, is particularly advantageous. This can be achieved, for example, by the hardener component containing a carrier which is inert in relation to the hardener activity and/or, relative to the total composition, a portion of the filler and/or the thixotropic agent. Accordingly, the hardener may, for example, be present in the form of a 30-70% paste of dibenzoyl peroxide in a phthalate plasticizer. Typically, this could be a 50% paste. It may optionally include a portion of the total amount of fillers required, for example, quartz with a particle size of 0.04-0.15 mm in a mixing ratio of paste to quartz of approximately 2:1 parts by weight. In each case, the amounts of fillers and/or thixotropic agents introduced with the hardener together with the fillers and/or thixotropic agents contained in the unsaturated polyester component, form the specified total content of these components in accordance with the invention.

The polyester resins which can be used within the scope of the present invention as unsaturated polyesters, are those which are conventionally used for such a purpose. Preferably, these are polyesters from lower, unsaturated discarboxylic acids, aromatic dicarboxylic or polycarboxylic acids, optionally also with condensed rings and lower aliphatic polyols, particularly diols. Especially preferred examples are unsaturated polyesters from maleic acid, o-phthalic acid and propylene glycol as a 65% solution in styrene, preaccelerated with tertiary aromatic amines and stabilized with phenolic inhibitors. Fumaric acid can also be used instead of maleic acid. The ratio of maleic acid to o-phthalic acid can vary from 2:1 to 1:2.

Because of their reactivity, amine-accelerated polyesters are preferred.

The unsaturated polyesters can be introduced as such, in admixture with fillers and the like, or with other solid or liquid carriers, e.g., in the form of their solutions. Inert carriers can be used as the solvent, even though reactive diluents are preferred. The usual α-olefin compounds, which are known as reactive diluents, such as, for example, styrene and divinyl benzene, may be used as reactive diluents. The mixing ratio of unsaturated polyester to reactive diluent generally falls within the range of 2:0.8 to 2.5 parts by weight, a mixing ratio of about 2:1.5 parts by weight being particularly suitable.

In a preferred embodiment, the unsaturated polyester and the reactive diluent together comprise 36–40 weight percent of the inventive hardenable mortar composition.

The preferred filler is quartz although mineral fillers conventionally employed for such purposes, such as, kaolin, barium sulfate, glass fiber, glass spheres and the like, can also be used. Preferably therefore, the inventive compositions contain essentially quartz as filler, for example, 65 weight percent and more, and preferably more than about 80 weight percent, based on the total amount of filler, the use of quartz as the only filler has proven to be particularly successful. In accordance with the invention, the quartz particles generally have a diameter of 0.1 to 0.6 or even of 0.1 to 0.25 mm. Generally, at least 50%, preferably more than 60%, and frequently even more than 80% of the total number of particles fall within this particle size range. A typical particle size distribution in accordance with the invention is approximately as follows:

| Particle Size Distribution | Silica Sand 0.1–0.25 mm | Silica Sand 0.1–0.65 mm |
| --- | --- | --- |
| >250 μm | 4.9% | 66.5% |
| 250–125 μm | 81.9% | 25.3% |
| 125–90 μm | 10.9% | 6.8% |
| 90–63 μm | 2.0% | 1.1% |
| 63–32 μm | 0.3% | 0.1% |
| <32 μm | 0.1% | 0% |

The usual quartz grains can be used even though fire-dried quartz grains with rounded edges are especially preferred. The fillers, particularly the quartz, are preferably surface-treated with coupling agents, such as, for example, silanes.

Conventional materials can be used as thixotropic agents, even though materials, such as pyrogenic silica, especially pyrogenic silica which has been surface treated with an organic compound to enhance the thixotropic effect and moreover, kaolin, bentonite, montmorillonite, asbestos and/or organic fiber materials are preferred. Mixtures of bentonite and montmorillonite have proven to be very suitable. The thixotropic agents have an appreciable effect on the flow behavior of the inventive composition. Even in the low viscosity range, the thixotropic agent should prevent the inventive composition from running out of the boreholes in horizontal or overhead installations. Furthermore, the thixotropic agents counteract sedimentation of the fillers and therefore noticeably increase storage stability. Thus, the thixotropic agents are preferably contained in the component which also contains the filler. Alternatively, they can be divided between the components in proportion to their filler contents.

The hardener, contained in the hardener component for curing the unsaturated polyester, is a conventional free radical catalyst. Organic peroxide compounds, such as, for example, dibenzoyl peroxide, are preferred.

The hardener may be contained in an inert carrier, for example, a plasticizer for the polyester resin, such as, for example, a phthalate plasticizer. Inventive compositions, in which the hardener component contains the inert carrier as well as certain amounts of filler and/or thixotropic agents and has about the same viscosity as the component containing the unsaturated polyester, have been especially successful.

The inventive compositions may furthermore contain other conventional additives, such as, pigments, dyes, extenders, viscosity modifiers, solvents and the like.

The curing of the inventive mortar composition is initiated by intimately mixing the polyester component with the hardener component in a known manner. At room temperature, curing times generally fall within the range of 30 to 60 minutes and load absorption is possible within the range of permissible load values after only about 5 minutes.

In accordance with a particularly preferred modification, the inventive two-component mortar compositions contain, in total or mixed for curing, 20 to 24, and especially, 21 to 21.5 weight percent of unsaturated polyester, 12 to 20, and especially, 14 to 17 weight percent of reactive diluent, 46 to 59 and, especially, 52–57 weight percent of filler, 1 to 3, and especially, 1.0 to 2.5 weight percent of a thixotropic agent and especially from 2.5 to 4.5 weight percent of a free radical curing catalyst, the percentage in each case being based on the total composition.

The inventive hardenable mortar compositions are used especially as mortar compositions for securing tie bars in boreholes in solid material, such as, concrete, masonry, rock and the like, that is, as essentially homogeneous, hard materials. In this connection, it has proven to be particularly successful to use mortar compositions, the particle size of whose quartz filler falls within the lower range, for smaller tie bars, while mortar compositions, the particle size of whose quartz filler falls within the upper range are used for larger tie bars. Particle size ranges from about 0.1 to 0.25 mm have proven to be particularly successful for securing M 6–M 16 tie bars with a maximum annular gap of 1 mm, while particle size ranges from about 0.4 to 0.6 mm have proven to be particularly successful for securing larger tie bars with annular gaps from about 1 to 2 mm.

The following examples illustrate a two-component mortar composition in accordance with the present invention:

EXAMPLE 1

Highly filled, unsaturated polyester mortar

| | |
| --- | --- |
| Unsaturated polyester resin (70% solution in styrene) | 32.0% |
| Benzoyl peroxide (50% solution in phthalate) | 2.0% |
| Pyrogenic silica | 1.0% |
| Silica sand 0.1 ... 0.45 mm | 65.0% |
| | 100.0% |

EXAMPLE 2

| Unsaturated polyester (60% solution in styrene) | 32.5% |
|---|---|
| Benzoyl peroxide (50% solution in phthalate) | 6.0% |
| Pyrogenic silica | 2.5% |
| Silica sand 0.1 ... 0.25 mm (posttreated with silane) | 55.0% |
| | 100.0% |

EXAMPLE 3

Filled, unsaturated polyester mortar

| Unsaturated polyester (65% solution in styrene) | 38.0% |
|---|---|
| Divinyl benzene | 3.5% |
| Pyrogenic silica | 3.5% |
| Benzoyl peroxide (50% solution in phthalate) | 10.0% |
| Silica sand 0.1 ... 0.6 mm | 45.0% |
| | 100.0% |

For curing, the polyester-containing component and the hardener-containing component are mixed in the proportions appropriate for obtaining the inventive compositions. For the sake of simplicity, specified mixing ratios are generally used. However, the mixing ratios can be modified readily within the inventive range.

We claim:

1. A method for securing tie bars in bore holes wherein mortar composition is contacted with the tie bar and allowed to harden, the improvement which comprises said composition comprising a total of
   15 to 35 weight percent of unsaturated polyester,
   9 to 25 weight percent of reactive diluent,
   44 to 66 weight percent of filler,
   0.5 to 4 weight percent of thixotropic agent, and 1 to 6 weight percent of a hardener composed of a free radical curing catalyst,
   the percentages being based in each case on the total composition.

2. A method for securing tie bars in bore holes wherein mortar composition is contacted with the tie bar and allowed to harden, the improvement which comprises said composition comprising
   20 to 24 weight percent of unsaturated polyester,
   12 to 20 weight percent of reactive diluent,
   46 to 59 weight percent of filler,
   1 to 3 weight percent of a thixotropic agent, and
   2.5 and 4.5 weight percent of free radical curing catalyst,
   the percentages being based in each case on the total composition.

3. A method for securing tie bars in bore holes wherein mortar composition is contacted with the tie bar and allowed to harden, the improvement which comprises said composition comprising
   21 to 21.5 weight percent of unsaturated polyester,
   14 to 17 weight percent of reactive diluent,
   52 to 57 weight percent of filler,
   1 to 2.5 weight percent of a thixotropic agent, and
   3 to 4 weight percent of free radical curing catalyst,
   the percentages being based in each case on the total composition.

4. The method of claim 1 wherein the total amount of unsaturated polyester and reactive diluent is 36 to 40 weight percent, based on the total composition.

5. The method of claim 1 wherein the unsaturated polyester and the reactive diluent are present in a ratio of 2:0.8 to 2.5.

6. The method of claim 4 wherein the unsaturated polyester and the reactive diluent are present in a ratio of 2:0.8 to 2.5.

7. The method of claim 5 wherein the ratio is 2:1.5.

8. The method of claim 6 wherein the ratio is 2:1.5.

9. The method of claim 1 wherein the unsaturated polyester is an amine-accelerated polyester resin.

10. The method of claim 1 wherein the reactive diluent is monostyrene or divinyl benzene.

11. The method of claim 1 wherein the filler is quartz.

12. The method of claim 11 wherein the quartz has a particle size of 0.1 to 0.6 mm.

13. The method of claim 1 wherein the mortar composition contains a thixotropic agent selected from the group consisting of pyrogenic silica, kaolin, bentonite, montmorillonite, asbestos and organic fiber materials.

14. The method of claim 1 wherein the free radical curing catalyst is a peroxide hardener.

15. The mortar composition of claim 4 wherein the hardener is dibenzoyl peroxide.

* * * * *

UNITED STATES PATENT AND TRADEMARK OFFICE
CERTIFICATE OF CORRECTION

PATENT NO. : 4,518,283
DATED : May 21, 1985
INVENTOR(S) : Ludwig Gebauer, et al

It is certified that error appears in the above-identified patent and that said Letters Patent is hereby corrected as shown below:

In the heading of the patent it should read:

-- [73] Assignee: Hilti Aktiengesellschaft, Fürstentum Liechtenstein --

Signed and Sealed this

Eleventh Day of February 1986

[SEAL]

Attest:

DONALD J. QUIGG

Attesting Officer

Commissioner of Patents and Trademarks